Patented May 9, 1939

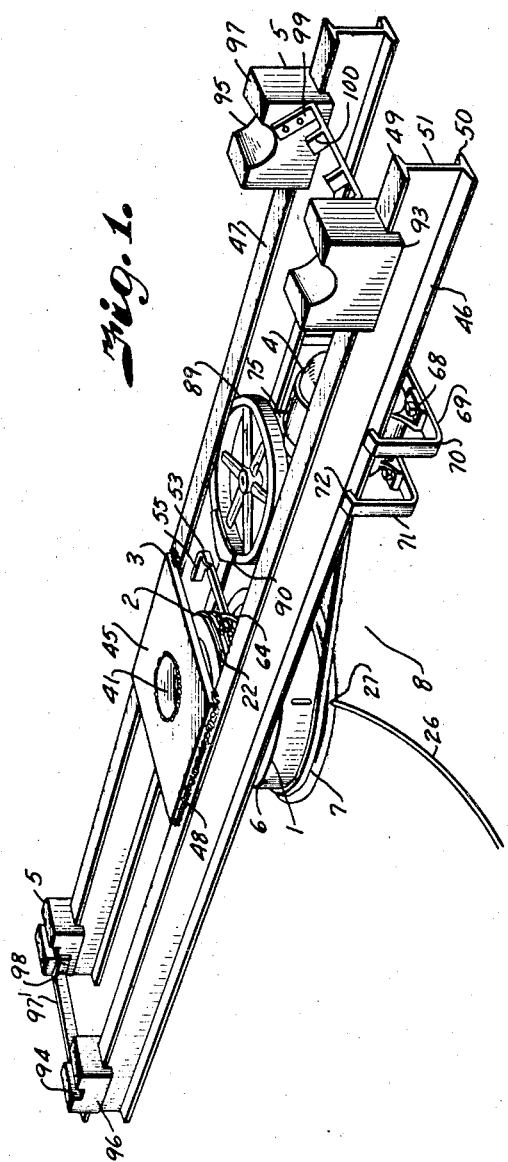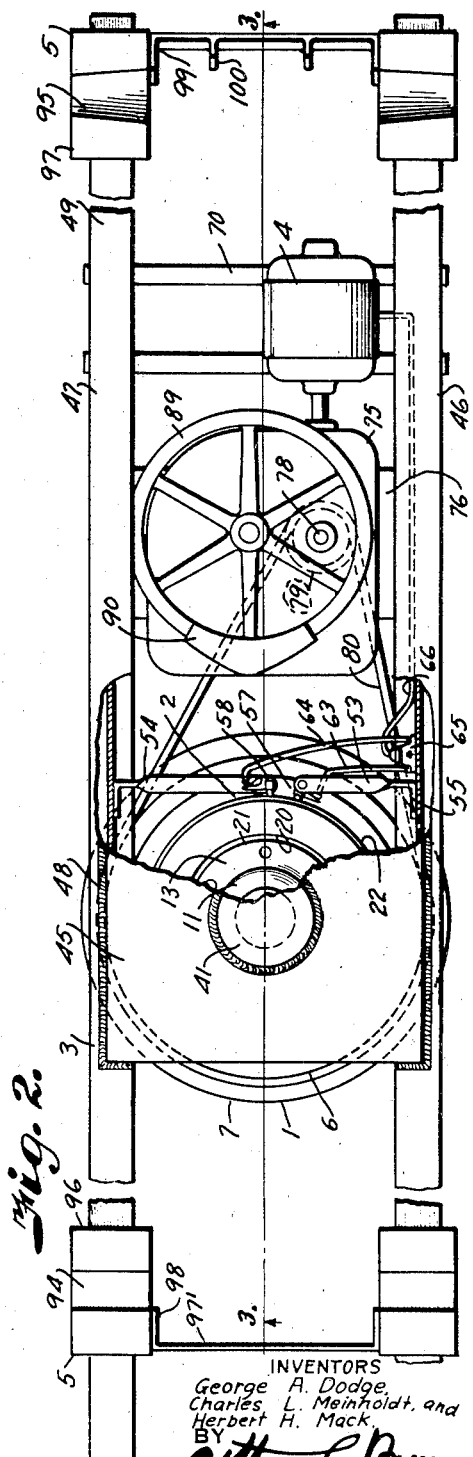

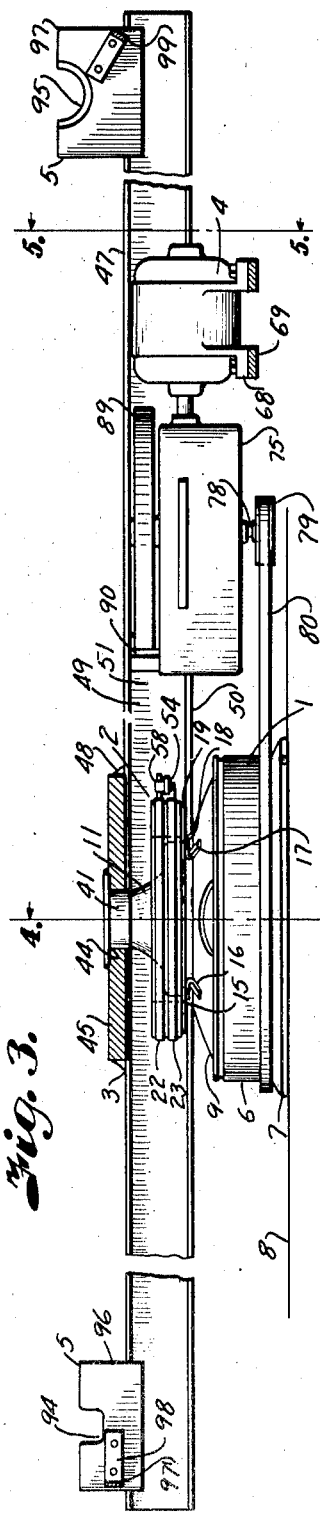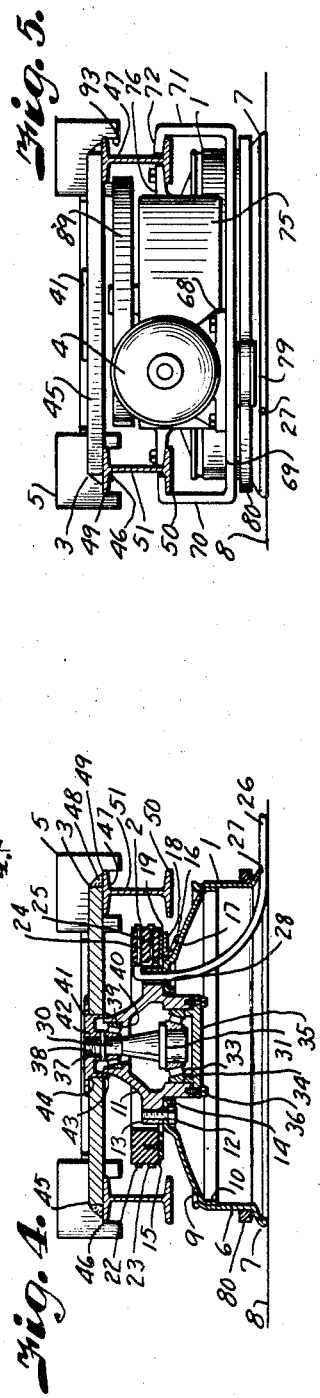

2,157,404

UNITED STATES PATENT OFFICE 2,157,404

TURNTABLE

George A. Dodge, Charles L. Meinholdt, and Herbert H. Mack, Topeka, Kans.; said Dodge and said Meinholdt assignors to said Mack Application May 17, 1937, Serial No. 142,958

2 Claims. (Cl. 104—44)

This invention relates to turntables, and more particularly to a turntable, especially adapted for effectively displaying commodities, such as automobiles, on a sales lot, show-room floor, or the like.

It is the principal object of the present invention to provide a turntable adapted for supporting an automobile or other object to be sold, in such a manner as to enhance its salability.

Other objects of the invention are to provide a turntable of this character which is substantially concealed by the article supported and which does not thereby detract from the appearance of the article; to provide a turntable of relatively simple construction, and which is economical in operation; to provide safety features in connection with the turntable which preclude injury to prospective purchasers viewing the displayed article and to the article itself; and to provide a turntable capable of movably supporting the commodity to be sold, which results in attracting the attention of prospective purchasers to the various features thereof for aiding in inducing the sale of the commodity.

In accomplishing these and other objects of the present invention, we have provided improved details of structure, the preferred form of which is illustrated in the accompanying drawings, wherein:

Fig. 1 is a perspective view of a turntable embodying the features of the present invention, the turntable being in condition to support an automobile, truck, or the like, for effectively displaying same.

Fig. 2 is a plan view of our improved turntable, parts thereof being broken away to illustrate the commutator and brushes therefor.

Fig. 3 is a longitudinal section through the turntable, on the line 3—3, Fig. 2.

Fig. 4 is a transverse section through the turntable on the line 4—4, Fig. 3.

Fig. 5 is a similar transverse section on the line 5—5, Fig. 3.

Fig. 6 is a detail perspective view of one of the commutator brushes mounted on its support.

Fig. 7 is a bottom perspective view of one of the centering blocks for mounting an automobile on the turntable frame.

Referring more in detail to the drawings:

The invention generally consists of a support 1 formed from the wheel and spindle of a conventional motor truck, a commutator 2 mounted on the support, a frame 3 mounted on the spindle, and a motor 4 mounted on the frame electrically connected with the commutator and mechanically connected with the support for rotating the frame to display an automobile or the like (not shown) resting on the adjustable blocks 5 of the frame.

More particularly, the support 1 consists of a conventional wheel rim 6 having the usual outwardly flared flange 7 at one end thereof which adapts the support for frictional, or more restrained, seating on the floor or ground 8 of a show-room or car lot. Fixed to the rim 6 is a wheel spider 9 which is provided with the usual hub 11 having fastening devices 12, Fig. 4, extending into the annular flange 13 thereof from the upwardly offset flange 14 at the inner periphery of the wheel 9.

The offset of the flange 14 forms a shoulder 15 adapted for seating the angled ends of a plurality of spaced substantially V-shaped commutator supporting brackets 16, Fig. 4, having their lower arms 17 secured, as by welding, to the upper face of the wheel and having their upper arms 18 secured, as by welding, to the lower face of a commutator supporting ring 19. The ring 19 is spaced from and preferably in alignment with the lower face of the hub flange 14 and is adapted to engage the lower face of the commutator 2, which is secured thereto, as by screws or the like, to form a support for the commutator.

The commutator 2 is preferably of ring-like conformation and is formed of a suitable insulating material, the inner periphery 20 of the commutator being spaced from the outer periphery 21 of the hub flange.

A pair of spaced conductor rings 22 and 23 are mounted on the outer periphery of the commutator, which are respectively connected with the terminals 24 and 25 of a conductor 26 leading from a source of current supply (not shown) to the conductor rings through an opening 27 therefor in the base flange of the rim and through aligned openings 28 in the wheel and hub flange to the spaced conduits in the commutator communicating with the conductor rings.

The hub 11 forms a bearing housing for the spindle 30, which has an annular flange 31 spaced from the lower end thereof seating on the inner race of a tapered roller bearing 33, the outer race of the bearing seating on an annular flange 34 of a supporting cap 35 engageable with the bottom face of the hub 14 and secured thereto by fastening devices 36. The spindle 30 is also provided with an annular washer 37 sleeved on the upper threaded end 38 thereof, which seats on a tapered roller bearing 39, similar to the bearing 33 previously described, the bearing 39 being mounted in the hub on an annular flange 40 projecting from the interior of the hub in spaced relation to the upper end thereof.

A frame supporting cap 41 having a hub member 42 is threadedly mounted on the upper end 38 of the spindle and is provided with a downwardly extending skirt 43 slidably engageable about the outer upper surface of the hub 11, the skirt being inwardly spaced relative to the periphery of the cap 41 in such a manner that an angle is formed therebetween to provide a seat 44 for a preferably rectangular plate member 45, which is suitably secured in the seat 44, as by welding. The ends of the plate member 45 extend laterally relative to the cap to provide wings, each of which is secured to the respective I-beam frame members 46 and 47, as by welding or the like 48.

The I-beams 46 and 47 are of conventional construction and have the usual upper and lower flanges 49 and 50 connected by a web 51. The upper flanges 49 of the beams are preferably mounted on the under faces of the wings of the plate member, as by welding or the like, in parallel relation to each other and in spaced relation to the floor to thus rotatably mount the frame and an automobile supported thereby relative to the commutator and floor respectively.

In order to utilize the current supply connected with the commutator, brush brackets 52 are provided, as particularly shown in Fig. 6, the brackets consisting of arms 53 and 54 having lateral flanges 55 adapted for mounting the arms in aligned relation on the inner faces of the webs 51 of the I-beams. The arms 53 are preferably twisted to provide horizontally extending flat upper faces on the outer ends of which the brush housings 57 and 58 are suitably mounted, the housing 58 being mounted on the upper face at the end of the arm 54 and the housing 57 being mounted on the lower face of the end of the arm 53, in such a manner that the ways 59 formed in the housings open adjacent the respective conductor rings on the commutator.

Conventional brushes 60 are mounted in the ways of the housings and suitable springs 61 are provided having one of their ends fixed to the arms by the binding posts 62, Fig. 6, and their free ends engaging with the rear ends of the brushes to not only maintain the brushes in frictional engagement with the conductor rings, but also to form conductors for carrying current from the source of supply to the binding posts 62. Conductors 63 and 64 are mounted on the binding posts of the respective arms 53 and 54 and lead to an outlet member 65 suitably mounted on the inner face of one of the frame I-beams, where the wires thereof are joined and extended by the conductor 66 into circuit with the motor 4.

The motor 4 is preferably provided with spaced pairs of base flanges 68 which seat on and are secured to the spaced body members 69 of brackets 70, the brackets having upwardly extending arms 71 provided with inturned flanges 72 engageable over the outer lower flanges 50 of the I-beams for supporting the brackets and motor relative to the frame and between the beams thereof.

The motor 4 is provided with an armature having suitable connection with reduction gears (not shown) which are housed in the casing 75, the casing being provided with laterally extending flanges 76, Fig. 5, engageable over the lower inner flanges 50 of the I-beams for supporting the gear reduction mechanism in position relative to the motor and its armature. The gear reduction mechanism is provided with a power-take-off shaft 78 having a pulley 79 mounted thereon, a suitable endless belt 80 being engaged over the pulley and extending around the periphery of the rim of the support 1 in such a manner that as power is applied to the motor, the support remaining stationary, the frame is rotated to move an automobile or the like, which is supported thereby.

The gear reduction unit is also provided with a friction device preferably consisting of a wheel 89, the outer periphery of which is adapted to be engaged by a friction shoe 90 suitably mounted on the gear reduction housing, as shown in Figs. 1, 2 and 3, in such a manner that with the motor 4 idle, the frame may not be accidentally rotated by a person leaning, for example, against an object displayed on the frame. The amount of friction, however, is not sufficient to cause excessive drag on the motor and does not increase the wear thereon, or the cost of operating the turntable.

With the construction thus far described, it is apparent that the frame 3 is rotatably mounted relative to the commutator 2 and support 1 and that current is transmitted from a source of supply to the motor for effecting rotation of the frame.

In order to facilitate mounting an article to be sold, such as an automobile, on the frame, a plurality of the centering blocks 5 are provided, which have longitudinal grooves 93 in their bottom faces of a width adapting the blocks for engagement over the upper flanges 49 of the I-beams and which are provided with transverse grooves 94 and 95 in the front and rear blocks 96 and 97, respectively, the grooves 94 of the front blocks preferably being of rectangular shape to seat the front axle of a vehicle and the grooves 95 of the rear blocks 97 preferably being of dished or concave conformation for seating the customary cylindrical rear axle housing of the motor vehicle.

A bracket 97' having inwardly turned flanges 98 secured to the inner side faces of the front axle blocks 96 is provided for spacing the blocks to align them with the I-beams, and a substantially similar bracket 99 is secured to the rear axle housing blocks for the same purpose, spaced lugs 100 being provided centrally of the inner face of the bracket for facilitating centering of the vehicle relative to the frame.

The operation of an apparatus constructed as described is as follows:

Assuming an automobile to be mounted by its axles on the centering blocks of the frame 3, and further assuming that the turntable is mounted on the floor of a sales show-room and that prospective purchasers are present in the show-room, current is applied from the source of supply to the conductor rings 23 and 24 on the commutator through the conductor 26. Current is immediately transferred to the motor 4 through contact of the brushes 60 with the conductor rings and the motor is energized to drive the power-take-off shaft 78 through the reduction gearing in the housing, the pulley on the shaft transmitting the power thereof to the rim support 1. Since the rim is mounted on the show-room floor and, since the frame is rotatably suspended on the spindle through the cap 41, the frame will rotate and not the support. The frame and the vehicle on the frame are thus turned to display all the features thereof in such a manner that the prospective purchasers viewing the display do not have to move from their original positions.

Should an observer chance to lean against the vehicle, when the motor is not energized, rotation thereof is impeded due to frictional contact of the shoe 90 with the wheel 89 to thereby prevent any possible injury to such observer or vehicle, due to an unintended rotation or movement of the vehicle.

The principal advantages of an apparatus of this character over others heretofore employed are that it is simple in construction and economical to operate. The major portion of the parts are hidden from the view of a prospective purchaser and, therefore, cannot detract from the appearance of a vehicle being displayed. The device is practically soundless, due to the encasement of the gears and there are no open moving elements having metal to metal contact which might tend to rattle. Further, since the vehicle is raised but little from the floor or support, the appearance of the vehicle in actual use is simulated to enable the prospective purchaser to obtain a true and undistorted impression of the vehicle under observation.

What we claim and desire to secure by Letters Patent is:

1. A turntable of the character described including a circular rim forming a base and having an annular belt engaging face, a spider fixed to the rim and having a bearing housing rigidly mounted concentrically of said rim, a spindle journalled in the bearing housing, a vehicle supporting frame fixed to the spindle, a motor on said frame, a speed reduction mechanism on the frame and having a driven connection with the motor and a driving pulley arranged with its axis extending parallel with the axis of said circular rim, and a flexible belt operating over said driving pulley and over the belt engaging face of said rim whereby the frame is caused to revolve with the spindle rotating in said bearing housing.

2. A turntable of the character described including a circular rim forming a base and having an annular belt engaging face, a spider fixed to the rim and having a bearing housing rigidly mounted concentrically of said rim, vertically spaced antifriction thrust bearings mounted in the housing, a spindle rotatably supported in said antifriction bearings, a vehicle supporting frame fixed to the spindle, a motor on the frame, a speed reduction mechanism on the frame and having driven connection with the motor and a driving pulley arranged with its axis extending parallel with the axis of said rim, and a flexible belt operating over said driving pulley and over the belt engaging face of said rim whereby the frame is caused to revolve with the spindle rotating in said bearing housing.

GEORGE A. DODGE.
CHARLES L. MEINHOLDT.
HERBERT H. MACK.